(12) United States Patent
Yao et al.

(10) Patent No.: US 6,901,320 B2
(45) Date of Patent: May 31, 2005

(54) FRICTION COMPENSATION IN A VEHICLE STEERING SYSTEM

(75) Inventors: Yixin Yao, Ann Arbor, MI (US); Behrouz Ashrafi, Northville, MI (US); Ann Hayes Larsen, Southfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/342,957

(22) Filed: Jan. 15, 2003

(65) Prior Publication Data

US 2004/0138797 A1 Jul. 15, 2004

(51) Int. Cl.⁷ .................................................. B62D 6/00
(52) U.S. Cl. .......................................... 701/44; 701/41
(58) Field of Search .............................. 701/44, 41, 42; 348/148; 180/400, 402, 443, 444, 445, 446, 442; 318/632, 616, 432

(56) References Cited

U.S. PATENT DOCUMENTS

| | | | |
|---|---|---|---|
| 5,274,314 A | 12/1993 | Maqueira | 318/632 |
| 5,444,346 A | 8/1995 | Sudo et al. | 318/616 |
| 5,710,498 A | 1/1998 | Yutkowitz et al. | 318/632 |
| 5,832,402 A | 11/1998 | Brachert et al. | 701/72 |
| 6,013,994 A | 1/2000 | Endo et al. | 318/432 |
| 6,161,068 A | 12/2000 | Kurishige et al. | 701/41 |
| 6,250,419 B1 | 6/2001 | Chabaan et al. | 180/443 |
| 6,262,547 B1 | 7/2001 | Kifuku et al. | 318/432 |
| 6,293,366 B1 | 9/2001 | Chabaan et al. | 180/446 |
| 6,381,528 B1 | 4/2002 | Kawada et al. | 701/41 |
| 6,505,703 B2 * | 1/2003 | Stout et al. | 180/446 |
| 6,535,806 B2 * | 3/2003 | Millsap et al. | 701/42 |
| 2002/0019690 A1 | 2/2002 | Kurishige et al. | 701/41 |
| 2002/0040265 A1 | 4/2002 | Sadano et al. | 701/41 |

* cited by examiner

*Primary Examiner*—Richard M. Camby
*Assistant Examiner*—Christine M. Behncke
(74) *Attorney, Agent, or Firm*—Brinks Hofer Gilson & Lione

(57) ABSTRACT

The present invention provides systems and methods of friction compensation in a steer-by-wire system or in a general electric steering system using control, estimation and modeling methodologies. A friction compensator in the steer-by-wire control system produces a friction compensating torque value equal and opposite in sign to the instantaneous friction torque. This compensating friction torque is added to the steering system control signal to eliminate the effects of friction present in the system such that the system performances are improved. The friction compensator produces the compensating friction torque according to one of two schemes: model-based or non-model based. The model-based scheme encompasses a number of different methods including a standard model-based scheme, a disturbance torque observer-based scheme, an adaptive friction compensation scheme, or a model reference adaptive control scheme. The non-model based scheme includes a fuzzy logic scheme.

27 Claims, 7 Drawing Sheets

FRICTION COMPENSATION IN A VEHICLE STEERING SYSTEM

FIELD OF THE INVENTION

The present invention relates generally to friction compensation in a steering system for a vehicle and more particularly to friction compensation in a steer-by-wire system using model-based and non-model based friction compensation methodologies.

BACKGROUND AND SUMMARY OF THE PRESENT INVENTION

A typical automotive vehicle is steered by transmitting operations of a manually steerable device, such as a steering wheel, to a steering mechanism for directing the road wheels. Generally, the manually steerable device is located inside the vehicle passenger compartment, and the steerable road wheels are located at the front of the vehicle. Thus, a suitable steering mechanism is necessary to couple the manually steerable device and the road wheels.

In order to overcome limitations presented by mechanical steering systems, it has been proposed to utilize a steering system in which the manually steerable device is not mechanically coupled to the road wheels and steering movement is achieved by an electrically controlled motor, a so-called steer-by-wire system.

In a steer-by-wire system, a road wheel motor actuator, connected to the road wheels, operates in response to a control command generated by a road wheel controller. The road wheel controller receives various measurements and estimation signals such as steering wheel angle, road wheel angle, and vehicle speed, and sends a control command to the actuator in order to make the road wheels follow the steering wheel command. In a steer-by-wire system, there is no mechanical connection between the road wheel actuation system and the steering wheel, although both road wheels may be mechanically linked together to move in unison.

It has also been proposed to utilize a steer-by-wire system in which the two front road wheels are steered independently. In this type of steer-by-wire system, the two front road wheels are not mechanically coupled. Instead, the two independent actuators actuate the two road wheels independently.

As an electro-mechanical system, driven by electrical motors, the road wheel actuation steering mechanism of a steer-by-wire system is subject to the influence of friction in the form of a force or a torque. For example, a typical steer-by-wire system includes a pair of road wheels which each of them is driven by a ball screw via a DC brush-less motor. There are many sources of friction in such a system, including the ball screw bearings, the interface between the screw and the tie-rod, and the load and side load caused by the road wheels. The total friction force experienced by the steer-by-wire system is the sum of the respective frictions resident in the system. The resultant friction is highly nonlinear and may adversely affect the performance of the steering control system resulting in steady state errors, limit cycles, and stick-slip motion. Consequently, the road wheels may not follow the steering wheel command as desired.

Therefore, the friction force must be compensated for in order to ensure that the road wheels follow the steering wheel input command, especially at slow steering rate inputs. Although the friction acting on the motor actuator may be reduced through improved mechanical hardware design, there are, however, cost and space constraints associated with this solution.

Accordingly, the present invention utilizes control system methodologies to compensate and overcome the effects of friction present in a steer-by-wire system. Specifically, the present invention utilizes system modeling, estimation, and control methodologies to compensate the effects of friction in steer-by-wire systems.

A friction compensator in the steer-by-wire control system produces a friction compensating torque value equal and opposite in sign to the instantaneous friction torque. This compensating friction torque is added to the system control signal to eliminate the effects of friction present in the system. The friction compensator produces the compensating friction torque according to one of two schemes: model-based or non-model based. The model-based scheme is based on a suitable friction model that captures the behavior of the friction to compensate the friction torque. The non-model based scheme does not depend on models of friction to compensate the friction torque.

In the present invention invention, several model-based and non-model based friction compensation schemes are described. The model-based scheme encompasses a number of different methods including a standard model-based scheme, a disturbance torque observer-based scheme, an adaptive friction compensation scheme, or a model reference adaptive control scheme. The non-model based scheme includes a fuzzy logic scheme.

Although this invention describes friction compensation in a steer-by-wire system with two independent actuator-driven road wheels, it is not limited to such a steering system. The present invention is adaptable for use in any steer-by-wire or electromechanical steering system.

DETAILED DESCRIPTION OF A PREFERRED EMBODIMENT

Figure 1:
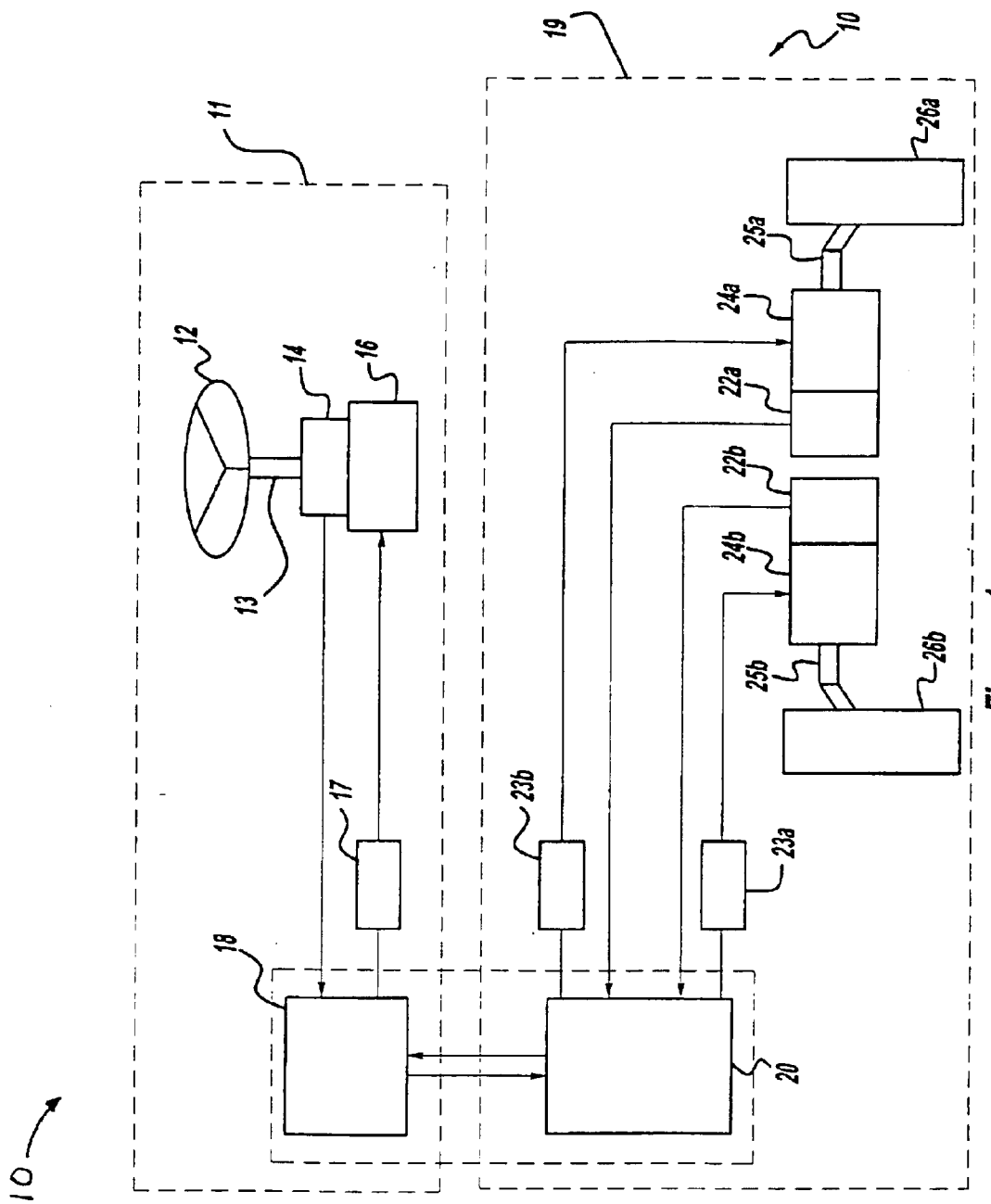
FIG. 1 is a schematic diagram of the steer-by-wire system in accordance with the present invention.

In accordance with its preferred embodiment, as shown in FIG. 1, the steer-by-wire system 10 of the present invention is generally composed of a steering wheel control system 11 and a road wheel control system 19. The steering wheel control system 11 includes a steering wheel 12 rotatable about a steering column 13. A steering wheel angle sensor 14 and a steering wheel motor actuator 16 are mounted on the steering shaft 13, and connected to a steering wheel control unit 18. A steering wheel motor amplifier 17 is used to drive the motor actuator 16.

The road wheel control system 19 includes a pair of road wheels 26a, 26b that are mechanically coupled to independent road wheel actuators 24a, 24b through tie rods 25a, 25b. The road wheel control system also includes a pair of road wheel angle sensors 22a, 22b for measuring the steer angle of the respective road wheels 26a, 26b. The road wheel actuators 24a, 24b and road wheel angle sensors 22a, 22b are connected to a road wheel control unit 20. A pair of road wheel motor amplifiers 23a, 23b drives the motor actuators 24a, 24b.

The steer-by-wire system 10 operates through the concerted control of the steering wheel control unit 18 and the road wheel control unit 20. The steering wheel control unit 18 receives signals from the steering wheel angle sensor 14 that are indicative of the angular position of the steering wheel 12, and signals from the road wheel control unit 20, that are indicative of at least the respective angular positions of the road wheels and drive torques of the road wheels 26a, and 26b. The steering wheel control unit 18 processes the input data based on a suitable steering wheel control algorithm and generates a controller output signal to the steering wheel actuator 16 to control the reaction torque on the steering wheel 12.

The road wheel control unit 20 receives a signal indicative of a desired steering wheel angle input from the steering wheel control unit 18, and signals indicative of at least the angular positions of the road wheels 26a, and 26b from the road wheel angle sensors 22a, and 22b. The road wheel control unit 20 processes the input data based on a suitable road wheel control algorithm and generates a controller output signal to the independent road wheel actuators 24a, and 24b to control the displacements of road wheels 26a, and 26b.

The main functions of the steering wheel system 11 are to provide a steering directional angular command and produce the familiar steering feel by controlling the reaction torque on the steering wheel 12. The main function of the road wheel system 19 is to ensure that the road wheel angular positions track the directional angular command generated by the steering wheel system 11. The steering wheel system 11 and the road wheel system 19 are integrated as a steer-by-wire system 10 by the steering wheel control unit 18 and the road wheel control unit 20.

Figure 2:
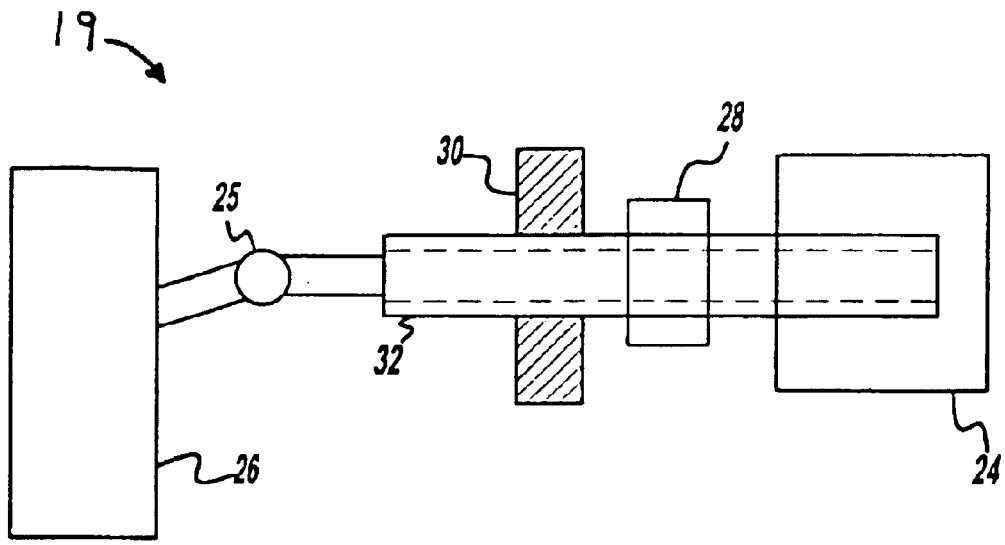
FIG. 2 is a schematic diagram of the road wheel mechanism including a ball-screw actuator and its assembly used in a steer-by-wire system in accordance with the present invention.

FIG. 2 is a schematic of the road wheel mechanism part of the road wheel control system 19. The road wheel mechanism includes a ball-screw actuator and its assembly. The road wheel 26 is coupled to a ball-screw steering mechanism 32 via a tie rod 25. The movement of the ball-screw mechanism 32 is facilitated by a set of bearings 30, and is governed by a nut 28. The road wheel actuator 24 drives the ball-screw mechanism 32 laterally, which causes the road wheel 26 to pivot through the tie rod 25. In a preferred embodiment, the road wheel actuator 24 is a DC brushless motor. The ball-screw mechanism 32 and the set of bearings 30 convert the rotation of a DC brushless motor into the lateral motion of road wheels.

Figure 3:
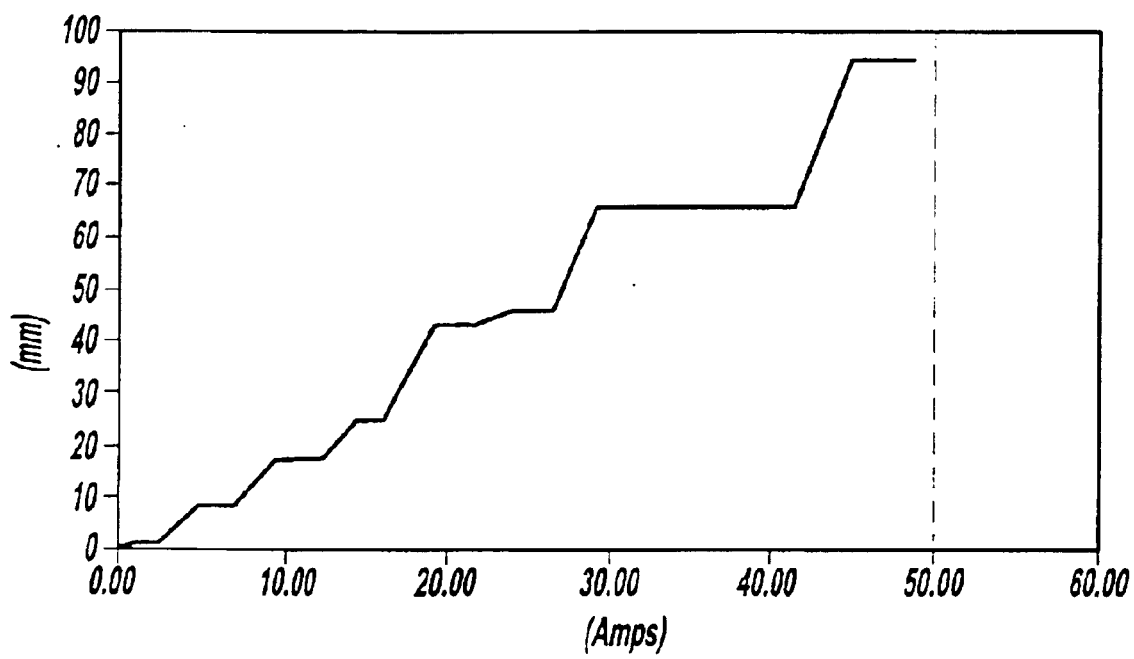
FIG. 3 is a graph representative of the relationship between motor current input and road wheel actuator displacement output without friction compensation and closed-loop control.

As noted, the road wheel actuator 24 is responsive to control signals from the road wheel control unit 20. FIG. 3 depicts the relationship between the motor current input signal measured in amps and the road wheel displacement measured in millimeters without any compensation for friction and the closed-loop control for the road wheel angular position. It is the experimental result of the typical stick-slip motion of the road wheel mechanism shown in FIG. 2. It is evident that the relationship between the motor current input signal and the road wheel displacement is highly nonlinear. The nonlinearity is caused mainly by the mechanical friction of the steering mechanism 32 of the road wheel control system 19 as shown in FIG. 2. In a typical road wheel mechanism, the friction torque may reach about 30% of the nominal actuation torque.

In order to realize the road wheel actuation in the steer-by-wire system of FIG. 1, a closed loop control system, using the angular position signals of the road wheel angle sensors 22a and 22b as feedback, is used to make the road wheels track the steering wheel command input. However, the friction present in the system may cause unexpected steady state errors, stick-slip motion, limited cycle, and poor overall system performance. Although it is possible to use mechanical hardware re-design to reduce the friction torque acting on the road wheel actuator 24a, 24b, this approach will result in increased costs and greater space limitations.

The present invention overcomes the foregoing limitations by compensating the friction through model-based and non model-based friction compensation methodologies. The principle of model-based friction compensation is to apply a force or torque command equal and opposite to the instantaneous friction force or torque. To accomplish this, an accurate friction model is therefore needed. In fact, the performance of model-based friction compensation control is ultimately determined by the ability of the model to accurately describe the dynamics of the physical controlled plant including the road wheel mechanism with friction.

Figure 4:
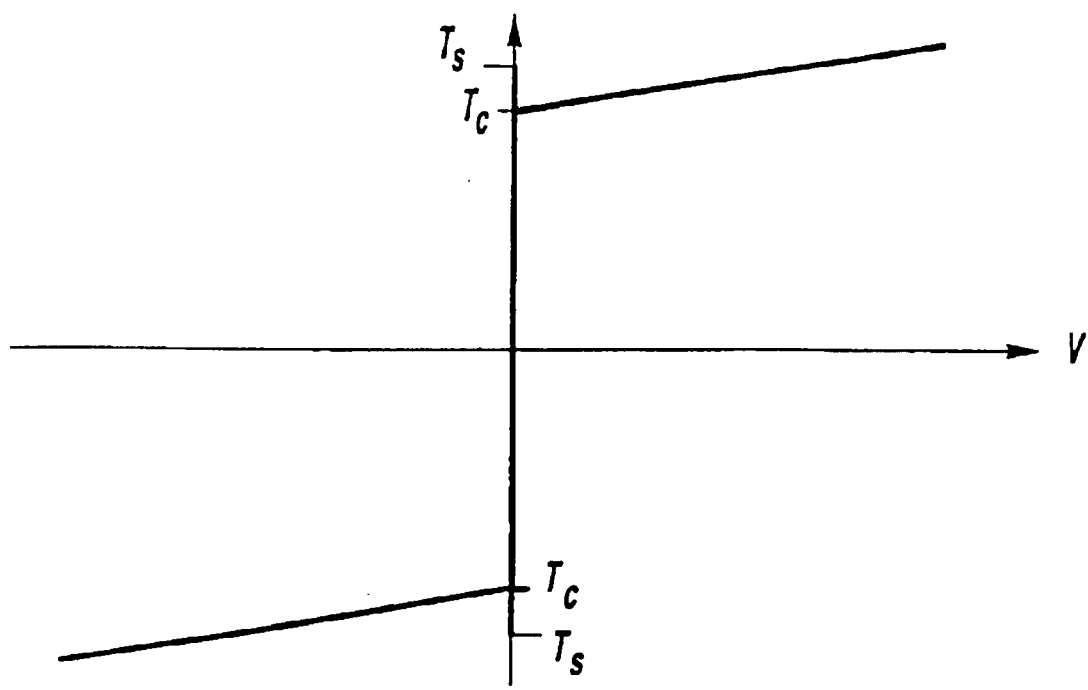
FIG. 4 is a graph representative of a typical static plus Coulomb and viscous friction.

In general, friction can be described by static or dynamic models. FIG. 4 is a graphical representation of a preferred friction model encompassing a static friction plus a Coulomb friction and a viscous friction. This friction model is described by the following equation:

$$\tau_f = \begin{cases} T_c \text{sgn}(\omega) + b\omega & \omega \neq 0 \\ T_e & \omega = 0, \text{ and } |T_e| < T_s \\ T_s \text{sgn} T_e & \omega = 0, \text{ and } |T_e| \geq T_s \end{cases} \quad (1)$$

where $T_c$ is the absolute magnitude of Coulomb friction torque, b is the viscous friction coefficient, $T_s$ is the absolute magnitude of static torque (break-away torque), ω is the angular velocity of road wheel motor actuator 24a, 24b, and $T_e$ is the external input torque. The function sgn (x) is the sign function or signum function. For a nonzero value of x, the sign function produces a value of negative one for a negative value of x, and a value of positive one for a positive value of x.

Coulomb friction is the friction that opposes motion and does not depend on velocity and contact area. The viscous friction torque is caused by the viscosity of lubricants. These two friction torques are described in the first line of Equation (1) with $T_{cf}=T_c\text{sgn}(\omega)$ representing the Coulomb friction and with $T_v=b\omega$ representing the viscous friction. Static friction is the friction at zero velocity and is a function of the external force. It is described in Equation (1) as $T_e$ for $|T_e|<T_s$ and $T_s\text{sgn}T_e$ for $|T_e|\geq T_s$ when the velocity v=0, where $T_e$ is the external applied force and $T_s$ is a static (break-away) friction force.

Figure 5:
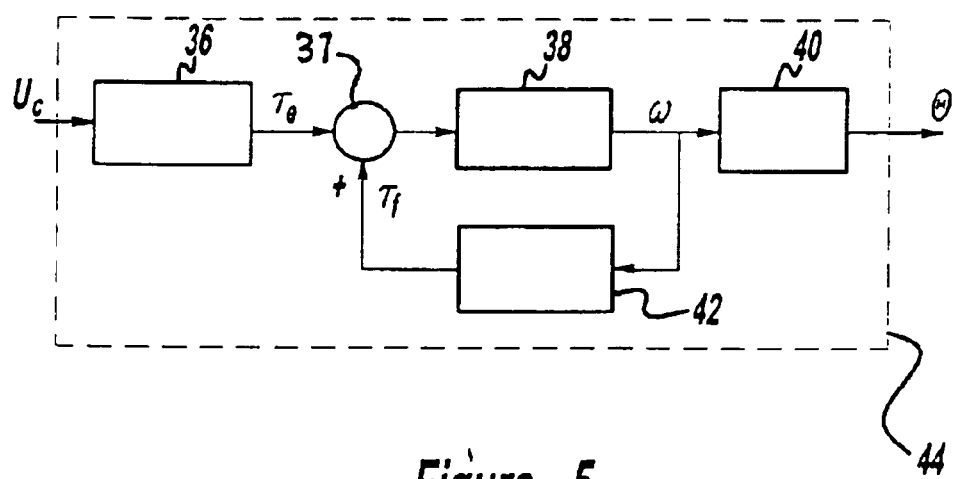
FIG. 5 is a block diagram of a road wheel controlled plant with friction nonlinearity representation.

FIG. 5 is a block diagram of a road wheel controlled plant 44 with friction nonlinearity representation. FIG. 5 gives the block diagram description of the road wheel controlled plant including the basic components of the road wheel mechanism in the steer-by-wire system 10. A motor amplifier 36 receives the control signal $u_c$ and drives the motor actuator to generate torque $\tau_e$. The motor actuator and its assembly 38, produce the output angular velocity $\omega$ and displacement$\theta$, under the action 37 of input torque $\tau_e$ and friction torque $\tau_f$. The integrator 40 represents the relation between angular velocity and displacement, and converts the angular velocity $\omega$ into an angular displacement$\theta$. The friction is represented as a feedback block 42 according to the mathematical model described in Equation (1). If the friction torque $\tau_f$ is equal to zero, the input torque $\tau_e$ will not be affected by the friction torque and it will be a complete effective torque for the motor actuator of the road wheel controlled plant as shown in FIG. 5.

Dynamic models of the friction present in the road wheel controlled plant can be developed in an attempt to better predict the friction phenomenon at low velocities. The dynamic models are often referred to as state variable models. The idea is to introduce extra state variables (or internal states) that determine the level of friction in addition to velocity. The evolution in time of the state variables is governed by a set of differential equations. As an example of a dynamic model, the Lu Gre friction model attempts to capture the stick-slip phenomenon of friction at low velocities. This dynamic model exhibits the capability of capturing low velocity effects.

Theoretically, friction is a continuous function of time. In general, state variable models such as the LuGre model will more accurately compensate for friction in systems that operate at very low or zero velocities. One of the major practical problems with these models is that their states are not measurable. As a consequence, friction compensation is often based on discontinuous and static models.

Figure 6:
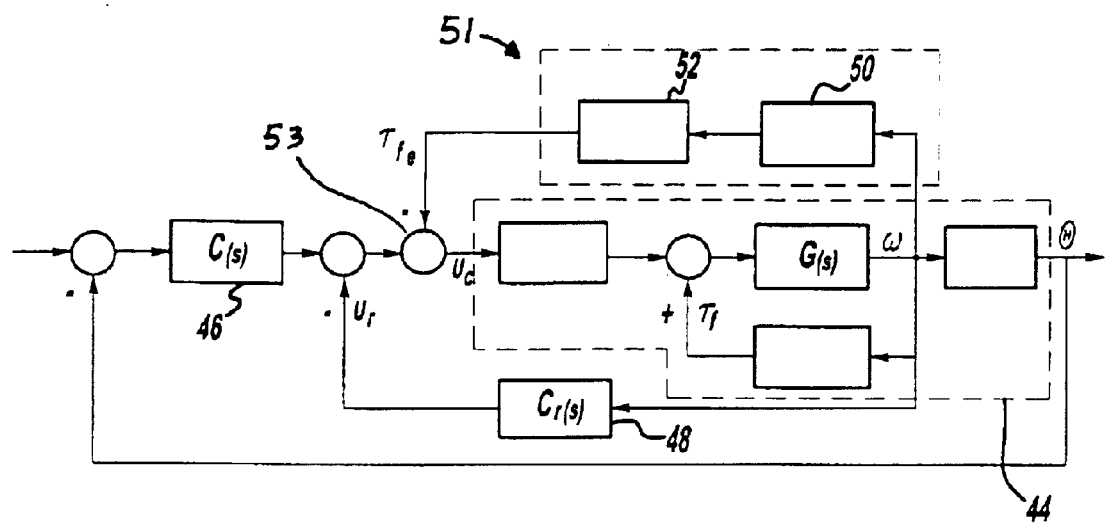
FIG. 6 is a block diagram of a road wheel control system with a standard model-based friction compensation scheme.

FIG. 6 is a block diagram of a road wheel control system with a standard model-based friction compensation scheme. It is based on an accurate known nonlinear friction model shown in Equation (1) and the feedback block 42 in FIG. 5. The actual friction, $\tau_f$, can be compensated by applying an equivalent model-based friction torque$\tau_{fe}$. The equivalent model-based friction torque, $\tau_{fe}$, is the output torque of the known friction model (1) and is opposite to the friction torque$\tau_f$. In FIG. 6, the friction torque $\tau_f$, is estimated using a friction predictor 50 and a gain function 52 that estimates the friction using the available measurements and a known friction model. The estimated friction, $\tau_{fe}$ is then added to the control signal, $u_c$, to compensate for the friction torque$\tau_f$.

FIG. 6 also shows a complete closed-loop feedback control block diagram of the road wheel system. The objective is to control the road wheel steer angles utilizing road wheel angular position and velocity feedbacks. The closed loop control system of FIG. 6 is composed of a road wheel angular position feedback and a road wheel angular velocity feedback. The angular position feedback loop is composed of the road wheel controlled plant 44, from the input $u_c$ to the road wheel angle $\theta$, and the position controller C(s), 46, with the road wheel angle negative feedback. The angular velocity feedback loop is composed of the road wheel controlled plant 44, from the input $u_c$ to the road wheel angular velocity $\omega$, and the velocity loop compensator $C_r(s)$, 48, with road wheel angular velocity negative feedback. The position loop controller C(s), 46, and velocity loop compensator $C_r(s)$, 48, are designed based on the requirements of control system stability and performances, such as road wheel angle tracking error, response time, and damping.

The friction compensation control loop 51 from the road wheel angular velocity$\omega$ to an estimated friction value $\tau_{fe}$, is introduced to improve the performance of the steer by wire system 10. In the friction compensation loop 51, the road wheel angular velocity is transmitted to a friction predictor 50 and a gain function 52. The friction predictor 50 is based on the known friction model shown in Equation (1), assuming that the static friction model is used. The output torque of the friction predictor 50 and gain function 52, that is the estimated friction, $\tau_{fe}$, then added at 53 to the control signal, $u_c$, to compensate for the friction torque, $\tau_f$, present in the controlled plant 44.

Alternatively, the friction predictor 54 in FIG. 6, may compensate the friction in the system utilizing nonlinear friction, such as static and Coulomb friction. In this case, the linear portions of the friction, such as viscous damping, may be compensated by the velocity loop compensator 48, $C_r(s)$.

Another example of model-based friction compensation methodology, applicable to the steer-by-wire control system 10, is a disturbance observer-based friction compensation method. In this methodology, the friction torque may be considered to be a disturbance torque. This compensation method uses an observer to estimate the disturbance torque. The estimated disturbance torque is then used to compensate the friction.

Figure 7:
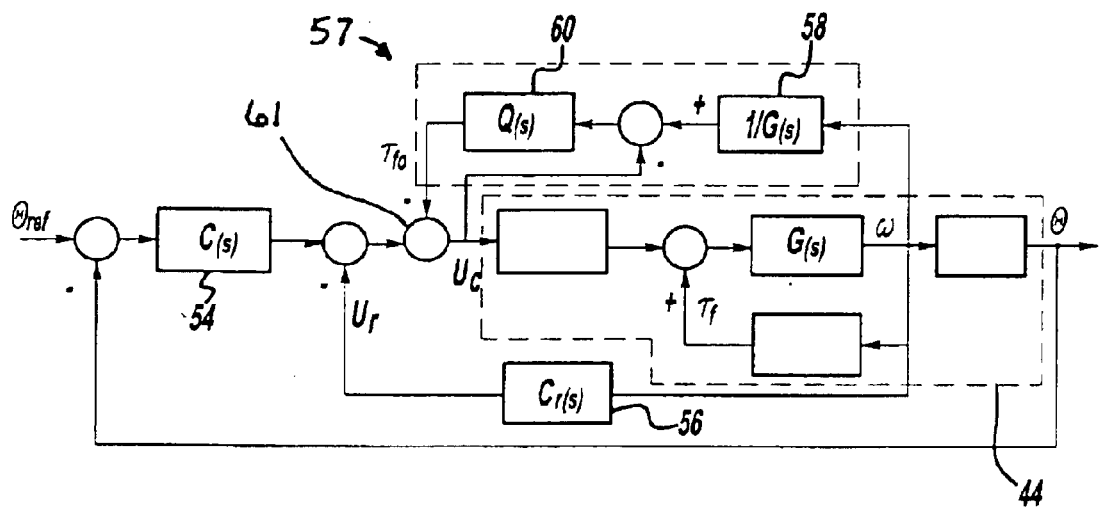
FIG. 7 is a block diagram of a road wheel control system with a disturbance torque observer based friction compensation scheme.

FIG. 7 gives a block diagram of a road wheel control system with a disturbance torque observer-based (DTO) 57 friction compensation scheme. The disturbance observer is devised to estimate an unknown torque by utilizing the inverse of the road wheel dynamic model and a low-pass filter. As shown in FIG. 7, the DTO consists of an inverse nominal model 1/G(s), 58, of the road wheel controlled plant 44 and a low-pass filter Q(s) 60. The output of this DTO 57, $\tau_{fo}$, is an estimate of the disturbance friction torque $\tau_f$. This estimated torque is then added at 61 to control signal $u_c$ to compensate the nonlinear friction $\tau_f$.

As mentioned above, the position loop controller C(s), 54, and velocity loop compensator Cr(s), 56, in FIG. 7, are designed based on the requirements of control system stability and performance. The nonlinear friction compensation using disturbance torque observer may overcome the friction effect to achieve the desired control system performance objectives.

Another model-based friction compensation methodology utilizes adaptive control techniques. An adaptive control methodology is particularly suitable for time-varying processes, which is a typical case for friction models whose parameters change with time. The friction in the road wheel mechanism 32, shown in FIG. 2, depends on operating point, load, lubrication, wear, and temperature. The previously described model-based friction compensation with fixed compensation parameters may have limitations dealing with this problem successfully. Experiments with a road wheel control system have shown that the parameters of friction compensation are sensitive to the operating conditions in a fixed parameter friction compensator. The adjustment of the parameters of the friction compensation scheme is also quite critical as inaccurate friction parameters may result in the degradation of the system performance. The adaptive friction compensation scheme described below may be applied to solve this problem.

Figure 8:
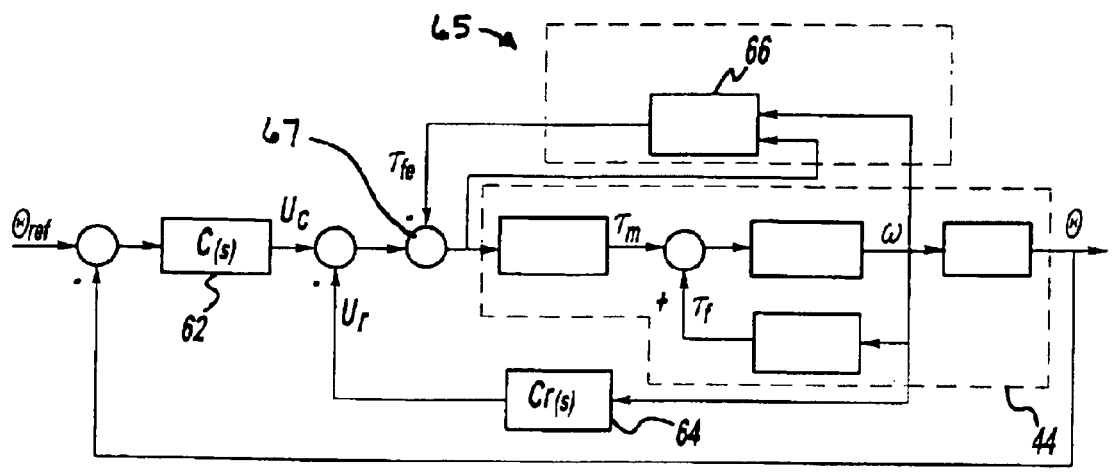
FIG. 8 is a block diagram of a road wheel control system with an adaptive friction compensation scheme.

FIG. 8 shows a block diagram of a road wheel control system with an adaptive friction compensation scheme 65. As shown in FIG. 8, the adaptive friction compensation control 65 includes a recursive-least-square (RLS) estimator 66 that provides an estimate of the friction torque, $\tau_{fe}$, which is then added at 67 to the control signal $u_c$ to compensate the nonlinear friction $\tau_f$ present in the controlled plant 44. As mentioned above, the position loop controller C(s), 62, and velocity loop compensator $C_r(S)$, 64, as shown in FIG. 8, are designed based on the requirements of control system stability and performances.

This adaptive methodology may also be extended to deal with variation in other parameters of the controlled plant 44 and, therefore, render a more complete friction model. Furthermore, the position loop controller C(s), 62, may also be designed using adaptive control structure and methodology. In this case, it is necessary to augment the controlled plant model and to estimate additional model parameters. When using adaptive control for road wheel controlled plant with friction, some important issues should be considered carefully, including stability problems, persistent excitation of the inputs for parameter estimation, updating rate, and choosing suitable identification methods.

As another example, a model reference adaptive control (MRAC) friction compensation scheme can also be used in the road wheel control system. The MRAC is a kind of adaptive control methodology in which the desired performance is expressed in terms of a reference model. The output of a reference model provides the desired response of the actual system. The MRAC scheme forces a system to follow the reference model despite poor knowledge of the system model parameters.

Figure 9:
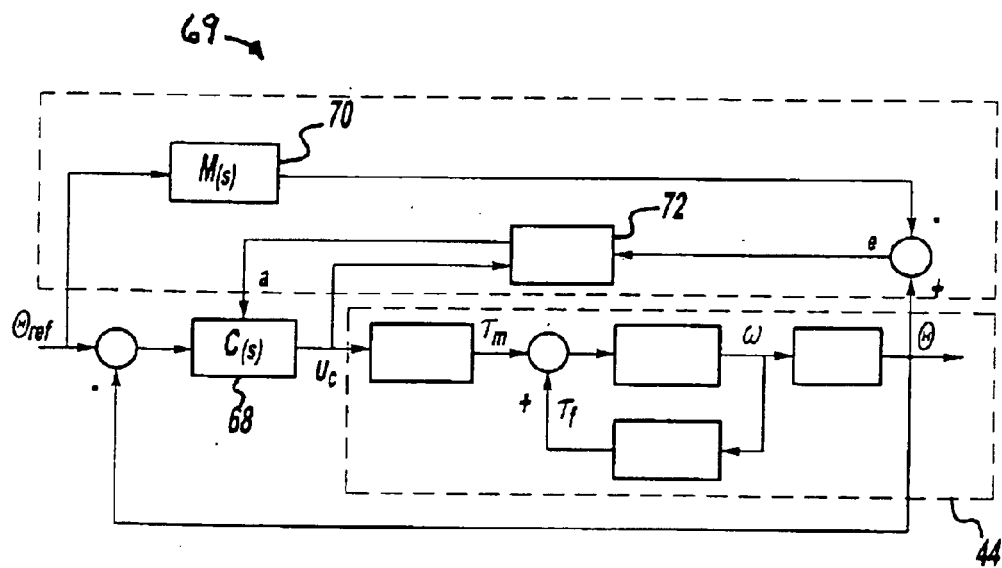
FIG. 9 is a block diagram of a road wheel control system with a model reference adaptive control friction compensation scheme.

FIG. 9 shows a block diagram of a road wheel control system with a model reference adaptive control friction compensation scheme 69. The main components of the MRAC 69 scheme include a reference model M(s), 70, that specifies the desired output of the controlled system, an ordinary road wheel angular position feedback loop with the controller C(s), 68, and the road wheel controlled plant 44. Another feedback loop with an estimator 72, adjusts and updates the parameters of the controller C(s), 68, on the basis of feedback from an error value, e, where the error is the difference between the road wheel angle output θ, and the output of the reference model 70. As a result, the road wheel angular output, θ, will follow the output of the reference model, and the effect of friction torque, $\tau_f$, will be reduced.

Although a typical MRAC is capable of forcing the controlled output to track the desired model output, special attention must be paid to the peculiar nonlinear dynamics of friction which dominates the motion in the transition between sticking and sliding. In an actual road wheel control system, it may be necessary to add a nonlinear feedforward compensator to eliminate the limit cycles generated by the nonlinear friction.

In the above-mentioned model-based friction compensation schemes, an accurate friction model is needed to obtain satisfactory friction compensation result. Therefore, the performance of model-based friction compensation control is ultimately limited by the ability of the model to accurately describe the dynamics of the controlled plant model including the friction. If a non-model based friction compensation is used, it is not necessary to model the friction or to consider the controlled plant model parameter changes mathematically.

In the road wheel control system of a steer-by-wire system, nonlinear and irregular friction characteristics are manifest at low vehicle speeds. Model-based friction compensation schemes may not be robust enough to adequately compensate for these irregularities. Accordingly, non-model based friction compensation techniques that can deal with highly nonlinear models are suitable for friction compensation of the road wheel control system. In particular, a fuzzy-logic control scheme utilized in conjunction with a classical feedback control scheme can be applied in the friction compensation of the road wheel control system.

Figure 10:
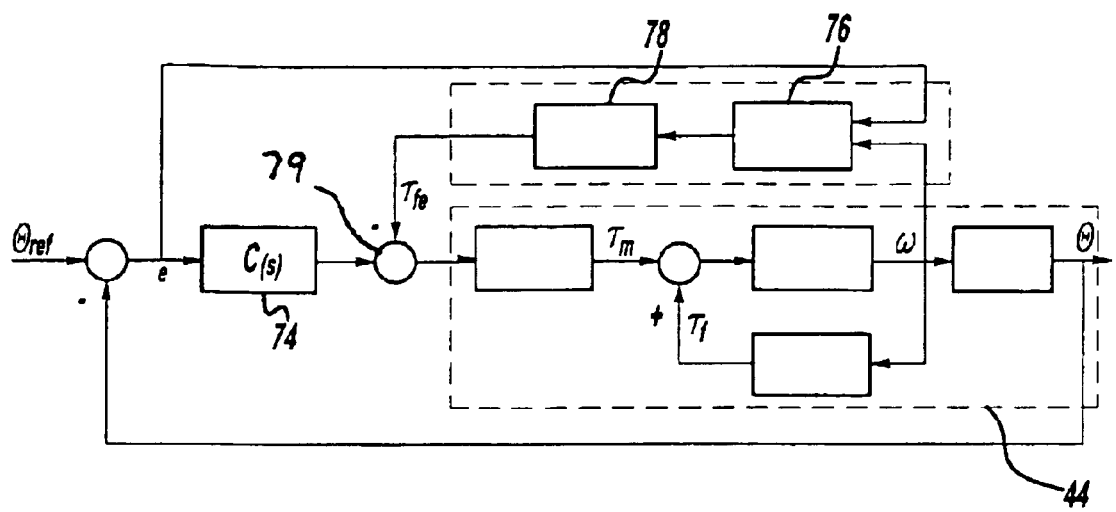
FIG. 10 is a block diagram of a road wheel control system with a fuzzy logic friction compensation scheme.

FIG. 10 shows a block diagram of the road wheel control system with a non-model based friction compensation that incorporates fuzzy logic based friction compensation. The fuzzy logic methodology enables the use of experimental results in designing a complex nonlinear friction compensator directly, and solves modeling difficulties for the controlled plant and friction.

As shown in FIG. 10, the non-model based friction compensation scheme includes a fuzzy logic based friction estimator, 76, to estimate the actual friction based on the road wheel angular velocity and the error between the actual road wheel angle θ and road wheel reference angle $\theta_{ref}$. The estimated friction is processed by a filter 78, which generates the compensating torque, $\tau_{fe}$, to compensate at 79 the actual friction torque, $\tau_f$, present in the controlled plant 44. The road wheel angular position feedback control scheme, with the controller 74, is combined with the fuzzy control scheme, and compensates for the residual friction.

Figure 11:
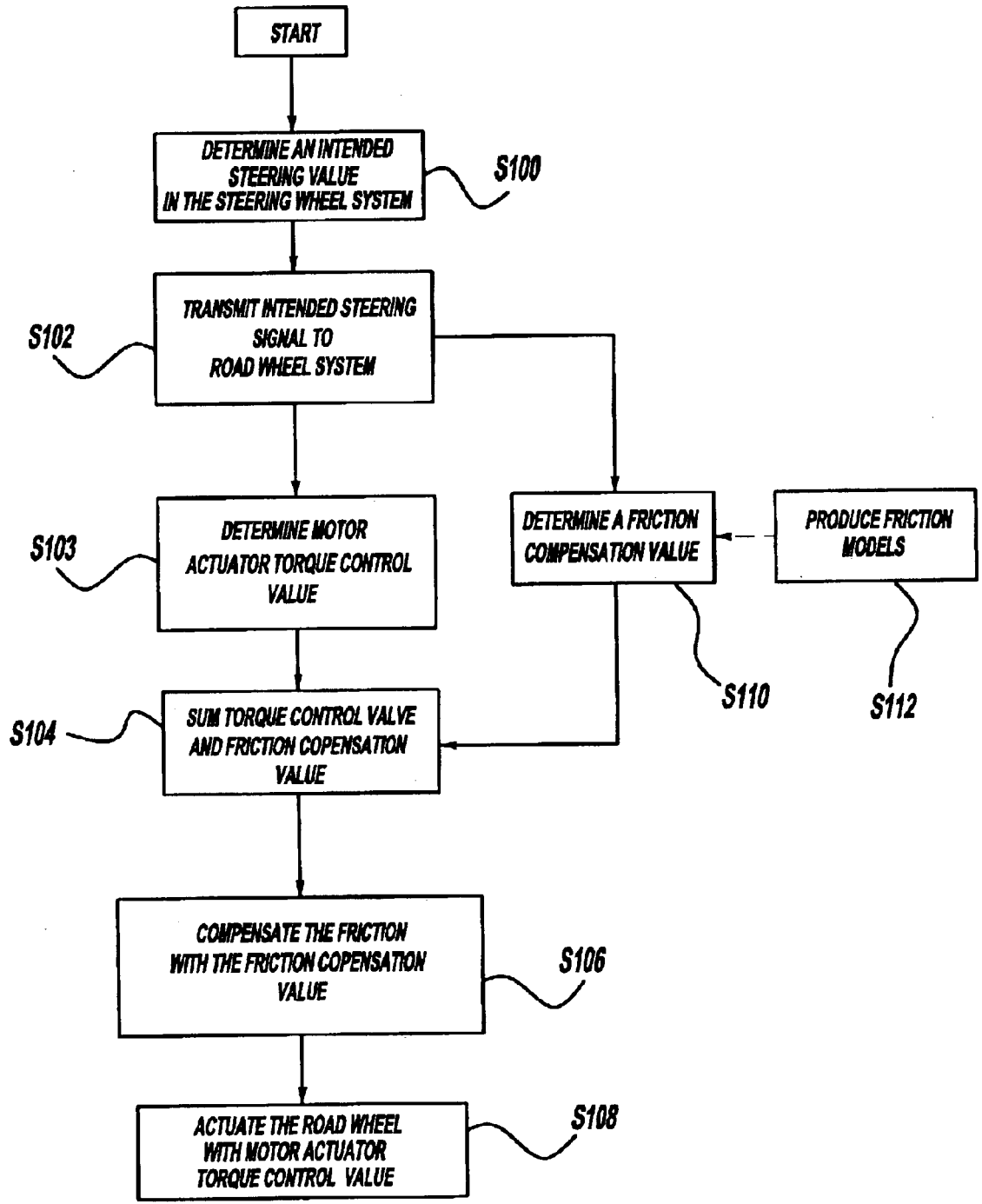
FIG. 11 is a flow chart illustrating a method of operating a steer-by-wire system in a vehicle.

The present invention may be further described with reference to a methodology for compensating friction in a steer-by-wire system. FIG. 11 is a flow chart illustrative of a method for operating a steer-by-wire system including friction compensation steps.

As shown in FIG. 11, upon commencing the method of operating a steer-by-wire system 10, an intended steering value is determined through the steering wheel control system in step S100. The intended steering value generally refers to the angle of rotation of the steering wheel; a determination for the intended steering value is made by the steering wheel control system 11. The intended steering angle is transmitted to the road wheel control system. The intended steering angle is used as a road wheel reference angle such that the actual road wheel angles may follow this reference angle as shown in step S102.

In step S103, a motor torque control value is determined by the control algorithms in order to make the actual road wheel angles track for the road wheel reference angle. This control value is generally generated by the angular position feedback controller C(s), shown in each control scheme from FIG. 6 to FIG. 10.

In step S104, a friction compensation value is determined in order to compensate the mechanical friction experienced by the steer-by-wire system 10 and to improve the overall system performance. The friction compensation value may be determined in accordance with a disturbance torque observer-based scheme, an adaptive friction compensation scheme, a model-reference adaptive friction compensation scheme, a standard model-based friction compensation scheme, or a non-model based friction compensation scheme.

In step S104, the motor torque control value and friction compensation value is summed as a control signal to control the road wheel mechanism with the non-linear friction.

In step S106, the actual friction is compensated by the friction compensation value. The effective control signal is then utilized to actuate the road wheels such that they track the intended steering value as shown in step S108.

The methodology of the present invention is further enhanced with the addition of step S112, which requires the production of friction models representing the actual friction torque in the steer-by-wire system 10. In step S110, a mathematical model of the friction in the steer-by-wire system 10 is utilized to approximate the actual friction. These models are applied in the model-based friction compensation schemes to produce the friction compensation values.

The foregoing discussion discloses and describes one preferred embodiment of the invention. One skilled in the art, will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

What is claimed is:

1. A method of operating a steer-by-wire system in a vehicle comprising the steps of:
   determining an intended steering value for directing at least one road wheel, the at least one road wheel included in a road wheel assembly;
   transmitting a signal indicative of the intended steering value to the road wheel system with at least a motor actuator;
   determining a motor torque control value by control algorithms;
   determining a friction compensation value;
   compensating the intended steering value affected with mechanical friction with the friction compensation value; and
   actuating the road wheels to track the intended steering value.

2. The method of claim 1 further comprising the step of producing a friction model.

3. The method of claim 1 wherein the friction compensation value is determined in accordance with a standard model-based scheme.

4. The method of claim 1 wherein the friction compensation value is determined in accordance with a disturbance torque observer-based scheme.

5. The method of claim 1 wherein the friction compensation value is determined in accordance with an adaptive friction compensation scheme.

6. The method of claim 1 wherein the friction compensation value is determined in accordance with a model reference adaptive control scheme.

7. The method of claim 1 wherein the friction compensation value is determined in accordance with a non-model-based scheme.

8. The method of claim 7 wherein the non-model based scheme includes a fuzzy logic friction estimator.

9. A steer-by-wire system for a vehicle comprising:
   a steering wheel connected to a steering wheel angle sensor and a steering wheel actuator;
   a first road wheel coupled to a pivotable device for enabling steering angle changes, the first road wheel connected to a road wheel angle sensor and a road wheel actuator; and
   a controller connected to the steering wheel angle sensor the steering wheel actuator, the road wheel angle sensor, and the road wheel actuator, the controller generates the road wheel actuator torque control value to actuate the road wheel actuator and to pivot the road wheel generating a road wheel angle movement, and controller further generate the steering wheel actuator torque control value to actuate the steering wheel actuator and to rotate the steering column generating a reaction torque on the steering wheel;
   wherein the steering wheel angle sensor measures an angular position of the steering wheel, and further wherein the road wheel angle sensor measures the road wheel angle; and
   wherein the controller further generates a friction compensating value, and further compensates the mechanical friction by the friction compensating value.

10. The steer-by-wire system of claim 9 further comprising a second road wheel disposed at a second end of a second pivotable device, the second road wheel connected to a second road wheel sensor and a second road wheel actuator.

11. The steer-by-wire system of claim 10 wherein the second road wheel angle sensor measures a second road wheel angle.

12. The steer-by-wire system of claim 10 wherein the second road wheel actuator is a DC brushless motor.

13. The steer-by-wire system of claim 9 wherein the controller generates the friction compensation value in one of a model-based scheme or a non-model-based scheme.

14. The steer-by-wire system of claim 9 wherein the controller generates the friction compensation value in a model-based scheme.

15. The steer-by-wire system of claim 14 wherein the model-based scheme comprises one of a standard model-based scheme, a disturbance torque observer-based scheme, an adaptive friction compensation scheme or a model reference adaptive control scheme.

16. The steer-by-wire system of claim 9 wherein the controller generates the friction compensation value in a standard model-based scheme.

17. The steer-by-wire system of claim 9 wherein the controller generates the friction compensation value in a disturbance torque of server-based scheme.

18. The steer-by-wire system of claim 9 wherein the controller generates the friction compensation value in an adaptive friction compensation scheme.

19. The steer-by-wire system of claim 9 wherein the controller generates the friction compensation value in a model reference adaptive control scheme.

20. The steer-by-wire system of claim 9 wherein the controller generates the friction compensation value in a non-model-based scheme.

21. The steer-by-wire system of claim 9 wherein the controller generates the friction compensation value in a fuzzy logic scheme.

22. The steer-by-wire system of claim 9 wherein the pivotable device includes at least a ball and screw system and a tie rod.

23. The steer-by-wire system of claim 9 wherein the road wheel actuator is a DC brushless motor.

24. The steer-by-wire system of claim 9 wherein the controller includes a steering wheel control unit and a road wheel control unit.

25. The steer-by-wire system of claim 9 wherein the controller includes a friction compensator.

26. The steer-by-wire system of claim 25 wherein the steering wheel control unit and the road wheel control unit are integrated.

27. The steer-by-wire system of claim 25 wherein the steering wheel control unit and the road wheel control unit are remotely connected.

* * * * *